(12) United States Patent
Egashira et al.

(10) Patent No.: US 12,087,964 B2
(45) Date of Patent: *Sep. 10, 2024

(54) BATTERY MODULE

(71) Applicant: SANYO Electric Co., Ltd., Osaka (JP)

(72) Inventors: Takuya Egashira, Hyogo (JP); Yusuke Fujii, Hyogo (JP); Nao Takeda, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 188 days.

This patent is subject to a terminal disclaimer.

(21) Appl. No.: 17/439,115

(22) PCT Filed: Dec. 26, 2019

(86) PCT No.: PCT/JP2019/051124
§ 371 (c)(1),
(2) Date: Sep. 14, 2021

(87) PCT Pub. No.: WO2020/194966
PCT Pub. Date: Oct. 1, 2020

(65) Prior Publication Data
US 2022/0149478 A1   May 12, 2022

(30) Foreign Application Priority Data
Mar. 22, 2019 (JP) ................. 2019-054578

(51) Int. Cl.
H01M 50/367 (2021.01)
H01M 50/209 (2021.01)
(Continued)

(52) U.S. Cl.
CPC ....... H01M 50/367 (2021.01); H01M 50/209 (2021.01); H01M 50/224 (2021.01);
(Continued)

(58) Field of Classification Search
CPC ............ H01M 50/367; H01M 50/209; H01M 50/224; H01M 50/262; H01M 50/271; H01M 2220/20
See application file for complete search history.

(56) References Cited

U.S. PATENT DOCUMENTS

| 2014/0322566 A1* | 10/2014 | Kim ..................... H01M 50/271 429/82 |
| 2014/0335385 A1* | 11/2014 | Ikeya .................. H01M 50/358 429/121 |
| 2021/0265700 A1* | 8/2021 | Egashira ............. H01M 50/507 |

FOREIGN PATENT DOCUMENTS

| JP | 2015-135763 A | 7/2015 |
| JP | 2015-211025 A | 11/2015 |

(Continued)

OTHER PUBLICATIONS

Bayer, Snap-Fit Joints for Plastics, available online on Apr. 28, 2018, obtained from: https://web.archive.org/web/20180428151548/https://fab.cba.mit.edu/classes/S62.12/people/vernelle.noel/Plastic_Snap_fit_design.pdf on Jun. 14, 2023 (Year: 2018).*

(Continued)

Primary Examiner — Michael L Dignan
(74) Attorney, Agent, or Firm — WHDA, LLP

(57) ABSTRACT

The battery module includes: battery stack including a plurality of batteries that are stacked, each of the plurality of batteries having valve portion; duct plate configured to cover a surface of battery stack on which the plurality of valve portions are disposed, duct plate having gas discharge duct that is connected to valve portions of respective batteries, and temporarily stores a blown-off gas; cover plate placed on duct plate; and flow path portion defined by duct plate and cover plate, flow path portion extending from gas discharge duct and allowing leaking of a gas in gas discharge duct to an outside of battery module. Cover plate is disposed in a (Continued)

state where a predetermined gap is formed between cover plate and first wall portion of gas discharge duct that faces valve portions, and opening that allows an inside of gas discharge duct and the gap to communicate with each other is formed in first wall portion of gas discharge duct.

5 Claims, 5 Drawing Sheets

(51) Int. Cl.
  *H01M 50/224* (2021.01)
  *H01M 50/262* (2021.01)
  *H01M 50/271* (2021.01)
(52) U.S. Cl.
  CPC ....... *H01M 50/262* (2021.01); *H01M 50/271* (2021.01); *H01M 2220/20* (2013.01)

(56) References Cited

FOREIGN PATENT DOCUMENTS

KR  2017-0069003  6/2017
WO  2013/161655  10/2013

OTHER PUBLICATIONS

Machine translation of JP-2015/211025-A. Obtained from PE2E. (Year: 2015).*
Machine translation of JP-2015/135763-A. Obtained from PE2E. (Year: 2015).*
International Search Report of PCT application No. PCT/JP2019/051124 dated Mar. 10, 2020.
The Extended European Search Report dated Apr. 14, 2022, issued in counterpart EP Application No. 19921804.1. (10 pages).

* cited by examiner

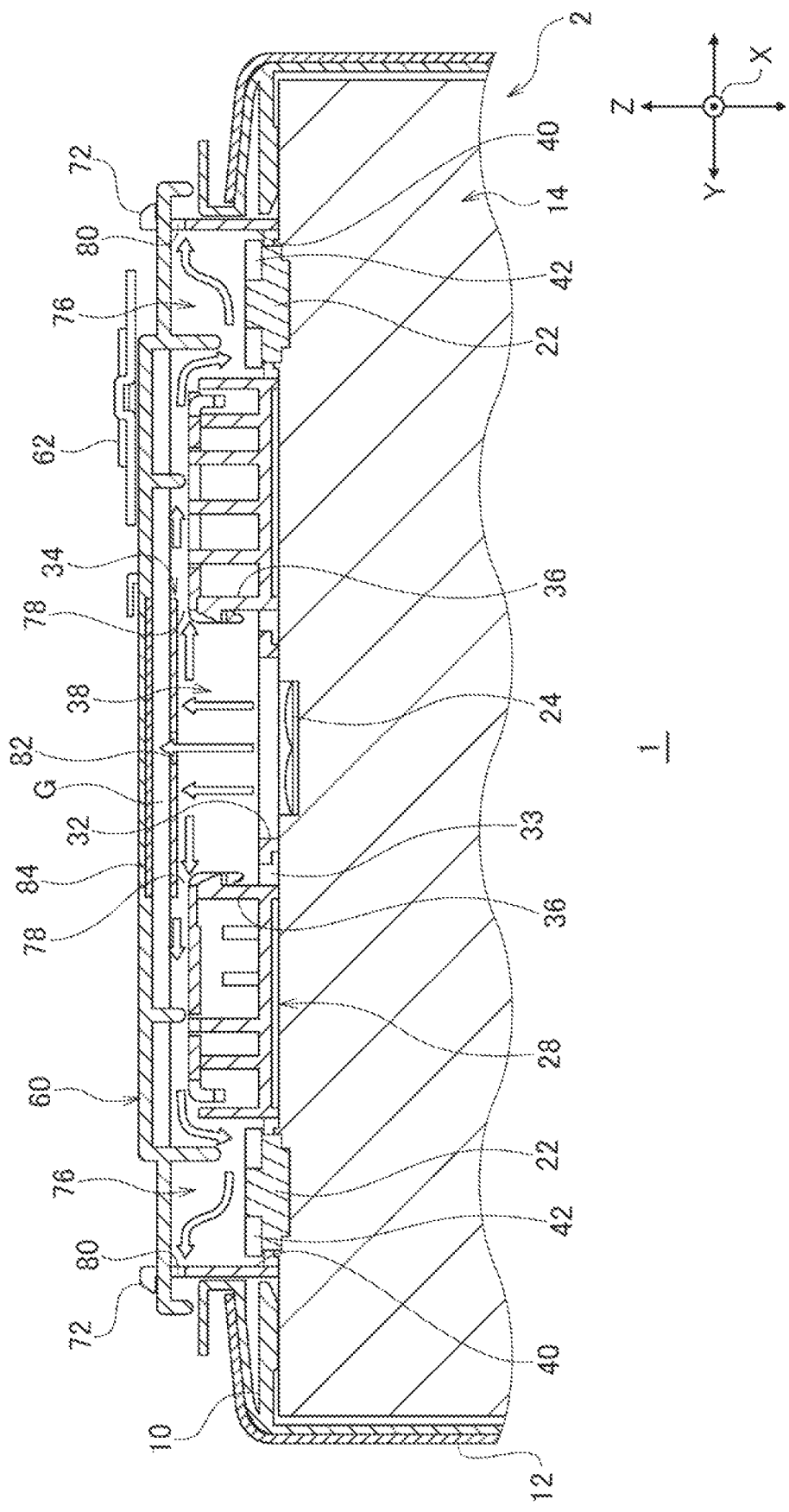

BATTERY MODULE

CROSS-REFERENCE TO RELATED APPLICATIONS

This application is a U.S. national stage application of the PCT International Application No. PCT/JP2019/051124 filed on Dec. 26, 2019, which claims the benefit of foreign priority of Japanese patent application No. 2019-054578 filed on Mar. 22, 2019, the contents all of which are incorporated herein by reference.

TECHNICAL FIELD

The present invention relates to a battery module.

BACKGROUND ART

For example, as a power source for a vehicle or the like that requires a high output voltage, there has been known a battery module formed by electrically connecting a plurality of batteries to each other. In general, each of the batteries that form the battery module is provided with a valve portion that opens in response to an increase in inner pressure. When a gas is generated in a battery due to a chemical reaction so that an inner pressure in the battery is increased, a gas having a high temperature and a high pressure is blown off from a valve portion. With respect to a battery module including such batteries, PTL 1 discloses a battery module which includes: a battery stack in which a plurality of batteries are stacked; and a gas discharge duct which is fixed to one surface of the battery stack in such a manner that the gas discharge duct is connected to the valve portions of the respective batteries.

CITATION LIST

Patent Literature

PTL 1: WO 2013/161655 A

SUMMARY OF THE INVENTION

In recent years, battery modules are required to further increase their capacities. In order to satisfy such requirement, the development of batteries having higher capacities has been in progress. When a capacity of a battery increases, an amount of a gas blown off from the battery increases. Accordingly, a force of an impact of the gas that the gas discharge duct receives increases. In the future, when a capacity of a battery is further increased so that an amount of gas blown off from the battery further increases, a risk that a gas discharge duct is damaged by an impact of the gas is increased so that the safety of the battery module is lowered.

The present invention has been made in view of such circumstances, and it is an object of the present invention to provide a technique which can enhance safety of a battery module.

Solution to Problems

According to one aspect of the present invention, there is provided a battery module having the following configuration. The battery module includes: a battery stack including a plurality of batteries that are stacked, each of the plurality of batteries having a valve portion through which a gas is blown off; a duct plate configured to cover a surface of the battery stack on which a plurality of the valve portions are disposed, the duct plate having a gas discharge duct that extends in a stacking direction of the batteries, is connected to the valve portions of the respective batteries, and temporarily stores a blown-off gas; a cover plate placed on the duct plate; and a flow path portion defined by the duct plate and the cover plate, the flow path portion extending from the gas discharge duct in a first direction that intersects with the stacking direction of the batteries and allowing leaking of the gas in the gas discharge duct to an outside of the battery module. The cover plate is disposed in a state where a predetermined gap is formed between the cover plate and a first wall portion of the gas discharge duct that faces the valve portion, and an opening that allows an inside of the gas discharge duct and the gap to communicate with each other is formed in the first wall portion of the gas discharge duct.

Any combinations of the above-described constituent elements, and configurations that are obtained by expressing the present invention in the form of method, apparatus, system and the like are also effective as the configuration of the present invention.

According to the present invention, the safety of a battery module can be enhanced.

BRIEF DESCRIPTION OF DRAWINGS

FIG. 5 is a cross-sectional side view of a region that includes a duct plate and a cover plate of a battery module according to a first modification.

DESCRIPTION OF EMBODIMENT

Hereinafter, the present invention will be described based on a preferred exemplary embodiment with reference to the drawings. The exemplary embodiment is an exemplification and does not limit the invention. All technical features described in the exemplary embodiment and combinations of these technical features are not always essential to the invention. The same reference symbols are assigned to the identical or equivalent constituent elements, members and processes illustrated in the respective drawings. Repeated explanation of the identical or equivalent constituent elements, members, and processes is omitted when necessary. Scales or shapes of respective portions illustrated in the respective drawings are set for convenience sake to facilitate the description of the portions. The scales or shapes of the portions should not be construed as limitation unless otherwise specified. Further, in a case where terms such as "first", "second", and the like are used in the present description and claims, these terms do not mean any order or the degree of importance unless otherwise specified, and are intended to be used to distinguish one configuration and another configuration from each other. Further, in each drawing, some members that are not important for describing the exemplary embodiment are omitted.

Figure 1:
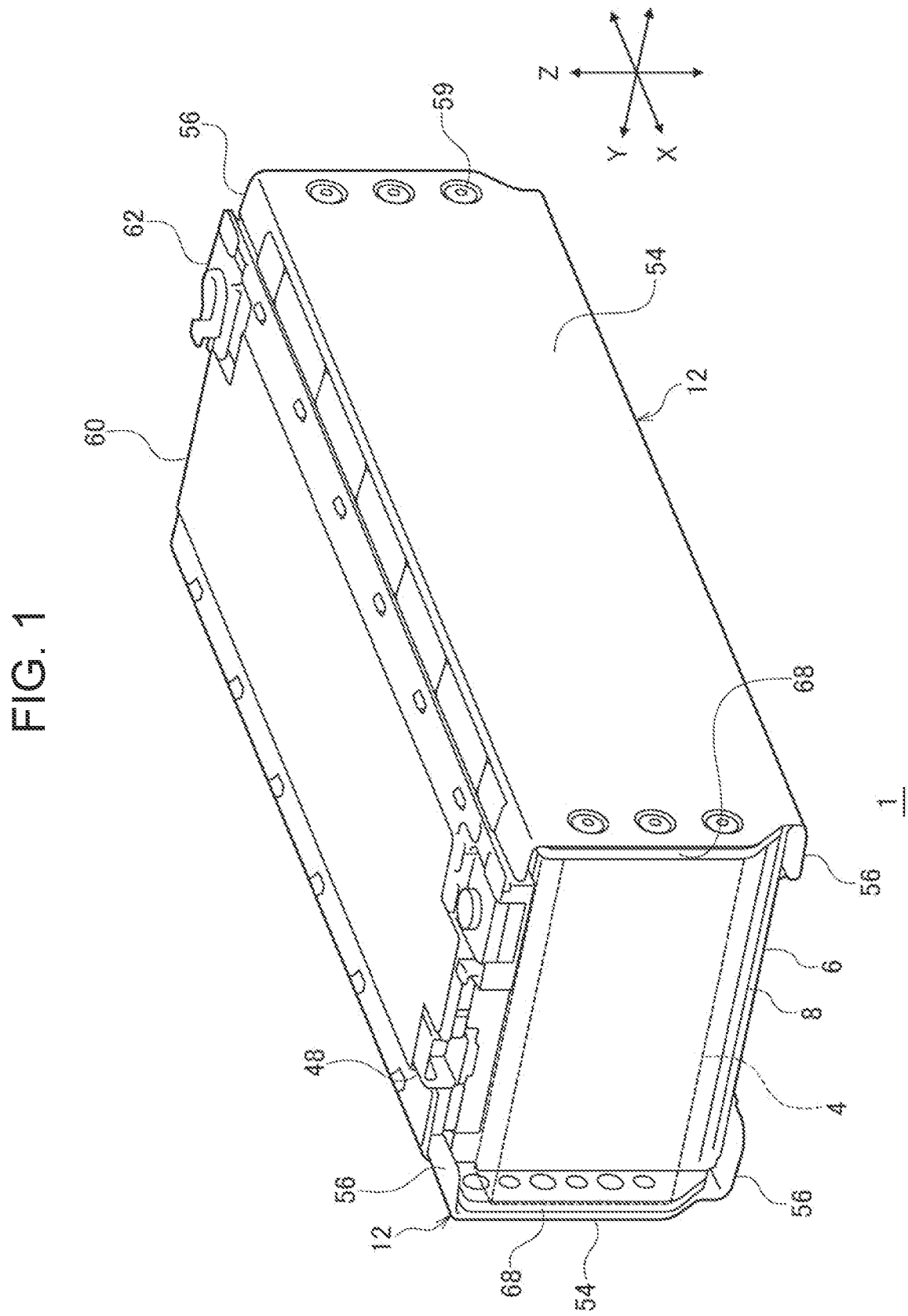
FIG. 1 is a perspective view of a battery module according to an exemplary embodiment.
Figure 2:
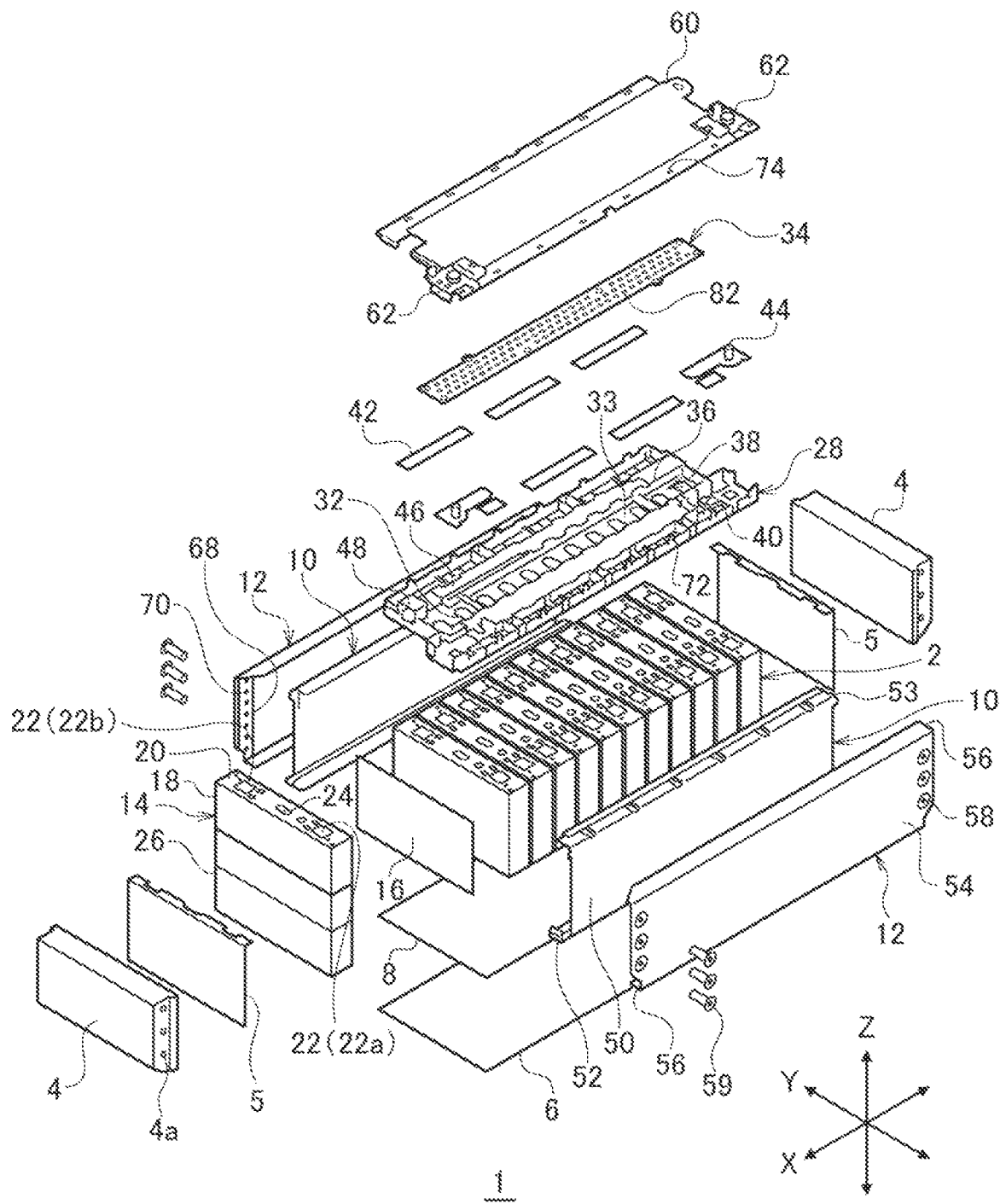
FIG. 2 is an exploded perspective view of the battery module.

FIG. 1 is a perspective view of a battery module according to an exemplary embodiment. FIG. 2 is an exploded perspective view of the battery module. Battery module 1 includes battery stack 2, a pair of end plates 4, cooling plate 6, heat conductive layer 8, side separators 10, constraining members 12, duct plate 28, and cover plate 60.

Battery stack 2 includes a plurality of batteries 14 and inter-cell separators 16. Each battery 14 is a chargeable secondary battery such as a lithium ion battery, a nickel-hydrogen battery, or a nickel-cadmium battery, for example. Each battery 14 is a so-called prismatic battery, and has exterior can 18 having a flat rectangular parallelepiped shape. Exterior can 18 has a substantially rectangular opening not shown in the drawings on one surface of exterior can 18. An electrode assembly, an electrolyte and the like are housed in exterior can 18 through the opening. Sealing plate 20 that closes the opening of exterior can 18 is disposed in the opening.

Output terminal 22 of a positive electrode is disposed on sealing plate 20 at a position close to one end of sealing plate 20 in a longitudinal direction, and output terminal 22 of a negative electrode is disposed on sealing plate 20 at a position close to the other end of sealing plate 20 in the longitudinal direction. The pair of output terminals 22 is respectively electrically connected to positive electrode plates and negative electrode plates that form the electrode assembly. Hereinafter, output terminal 22 of the positive electrode is referred to as positive electrode terminal 22a, and output terminal 22 of the negative electrode is referred to as negative electrode terminal 22b as appropriate. When there is no need to distinguish polarities of output terminals 22 from each other, positive electrode terminal 22a and negative electrode terminal 22b are collectively referred to as output terminals 22.

Exterior can 18, sealing plate 20, and output terminals 22 are electric conductors and are made of metal, for example. Sealing plate 20 and the opening of exterior can 18 are joined to each other by, for example, laser welding. Respective output terminals 22 are inserted into through holes (not illustrated) formed in sealing plate 20. A seal member (not illustrated) having insulating property is interposed between respective output terminals 22 and respective through holes.

In the description of the present exemplary embodiment, for convenience, sealing plate 20 forms an upper surface of battery 14, and a bottom surface of exterior can 18 disposed on a side opposite to sealing plate 20 forms a lower surface of battery 14. Battery 14 has two main surfaces that connect the upper surface and the lower surface of battery 14 to each other. The main surfaces are surfaces that have the largest area among six surfaces of battery 14. The main surfaces are long side surfaces that are connected to long sides of the upper surface and long sides of the lower surface. Two remaining surfaces other than the upper surface, the lower surface, and two main surfaces form side surfaces of battery 14. These side surfaces are a pair of short side surfaces that are connected to short sides of the upper surface and short sides of the lower surface.

For convenience, in battery stack 2, upper surfaces of batteries 14 form an upper surface of battery stack 2, lower surfaces of batteries 14 form a lower surface of battery stack 2, and side surfaces of batteries 14 form side surfaces of battery stack 2. These directions and positions are defined for convenience. Therefore, for example, the portion defined as the upper surface in the present invention does not always mean that the portion defined as the upper surface is positioned above the portion defined as the lower surface.

Valve portion 24 is disposed on sealing plate 20 between the pair of output terminals 22. Valve portion 24 is also referred to as a safety valve. Valve portion 24 is a mechanism which allows each battery 14 to blow off a gas in battery 14. Valve portion 24 is configured to release an internal gas by opening valve portion 24 when an inner pressure in exterior can 18 is increased to a predetermined value or more. For example, valve portion 24 is formed of; a thin wall portion that is formed on a portion of sealing plate 20 and is thinner than other portions of valve portion 24; and a linear groove formed on a surface of the thin wall portion. In this configuration, when an inner pressure in exterior can 18 increases, the thin wall portion is torn using the groove as a tearing starting point so that valve portion 24 is opened by tearing. Valve portions 24 of respective batteries 14 are connected to gas discharge duct 38 described later, and a gas in the battery is discharged from valve portion 24 to gas discharge duct 38.

Each battery 14 has insulating film 26. Insulating film 26 is, for example, a cylindrical shrink tube, and is heated after exterior can 18 is made to pass through insulating film 26. Accordingly, insulating film 26 shrinks and covers two main surfaces, two side surfaces, and bottom surface of exterior can 18. Insulating film 26 can prevent a short circuit between batteries 14 disposed adjacently to each other or a short circuit between battery 14 and end plate 4 or constraining member 12.

The plurality of batteries 14 are stacked to each other at a predetermined interval in a state where the main surfaces of batteries 14 disposed adjacently to each other face each other. The term "stack" means that a plurality of members are arranged in any one direction. Therefore, stacking of batteries 14 also includes an arrangement of the plurality of batteries 14 in a horizontal direction. In the present exemplary embodiment, batteries 14 are horizontally stacked. Accordingly, stacking direction X of batteries 14 is a direction extending horizontally. Hereinafter, when appropriate, a direction that is horizontal and is perpendicular to stacking direction X is referred to as horizontal direction Y, and a direction that is perpendicular to stacking direction X and horizontal direction Y is referred to as vertical direction Z.

Respective batteries 14 are disposed in a state where output terminals 22 are directed in the same direction. In the present exemplary embodiment, respective batteries 14 are disposed in a state where output terminals 22 are directed upward in the vertical direction. With respect to the respective batteries 14, when batteries 14 disposed adjacently to each other are connected in series, batteries 14 are stacked in a state where positive electrode terminal 22a of one battery 14 and negative electrode terminal 22b of other battery 14 are disposed adjacently to each other. When batteries 14 disposed adjacently to each other are connected in parallel, batteries 14 are stacked to each other in a state where positive electrode terminal 22a of one battery 14 and positive electrode terminal 22a of other battery 14 are disposed adjacently to each other.

Inter-cell separator 16 is also referred to as an insulating spacer, and is formed of a resin sheet having an insulating property, for example. As examples of the resin that are used for forming inter-cell separator 16, thermoplastic resins such as polypropylene (PP), polybutylene terephthalate (PBT), polycarbonate (PC), and Noryl (registered trademark) resin (modified PPE) are named. Inter-cell separator 16 is disposed between two batteries 14 disposed adjacently to each other and electrically insulates two batteries 14 from each other.

Battery stack 2 is sandwiched between the pair of end plates 4. The pair of end plates 4 is disposed at both ends of battery stack 2 in stacking direction X along which batteries 14 are stacked. The pair of end plates 4 is disposed adjacently to batteries 14 positioned at both ends of battery stack 2 in stacking direction X with external end separator 5 interposed between the end plate 4 and battery 14. External end separator 5 can be made of the same resin material as inter-cell separator 16. Each end plate 4 is a metal plate made of metal such as iron, stainless steel, or aluminum. By interposing external end separator 5 between end plate 4 and battery 14, end plate 4 and battery 14 are electrically insulated from each other.

Each end plate 4 has fastening holes 4a on two surfaces that are directed in horizontal direction Y. In the present exemplary embodiment, three fastening holes 4a are disposed at a predetermined interval in vertical direction Z. The surface where fastening holes 4a are formed faces flat surface portion 54 of constraining member 12. Flat surface portion 54 will be described later.

Duct plate 28 is placed on the upper surface of battery stack 2. Duct plate 28 is a plate-shaped member that covers the upper surface of battery stack 2, that is, duct plate 28 covers surfaces of respective batteries 14 on each of which valve portion 24 is disposed. Duct plate 28 has a plurality of openings 32 through which valve portions 24 are exposed at positions corresponding to valve portions 24 formed on respective batteries 14. The plurality of openings 32 are formed in base plate 33 extending along the upper surface of battery stack 2. Duct plate 28 includes gas discharge duct 38 that temporarily stores the gas blown off from respective batteries 14. Gas discharge duct 38 extends in stacking direction X of batteries 14 and is connected to valve portions 24 of respective batteries 14. Respective valve portions 24 communicate with gas discharge duct 38 through openings 32.

Gas discharge duct 38 is defined by: first wall portion 34 that covers the upper sides of the plurality of openings 32; and a pair of second wall portions 36 which surrounds the sides of respective openings 32. First wall portion 34 and the pair of second wall portions 36 respectively have an elongated shape elongated in stacking direction X. The pair of second wall portions 36 is arranged in horizontal direction Y with a plurality of openings 32 or a plurality of valve portions 24 interposed between the pair of second wall portions 36. The respective wall surfaces are directed in the first direction (horizontal direction Y in the present exemplary embodiment) that intersects with stacking direction X of batteries 14. First wall portion 34 has a wall surface facing the direction (vertical direction Z in the present exemplary embodiment) in which duct plate 28 and cover plate 60 are arranged, and faces each valve portion 24. The pair of second wall portions 36 protrudes from base plate 33 toward cover plate 60, and forms both side surfaces of gas discharge duct 38. First wall portion 34 is fixed to upper ends of the pair of second wall portions 36 to form a top surface of gas discharge duct 38.

Duct plate 28 has openings 40 through which output terminals 22 are exposed at positions corresponding to output terminals 22 of respective batteries 14. Bus bars 42 are placed on respective openings 40. The plurality of bus bars 42 are supported by duct plate 28. Accordingly, duct plate 28 also functions as a so-called bus bar plate. Bus bar 42 placed in respective openings 40 electrically connects output terminals 22 of batteries 14 disposed adjacently to each other.

Duct plate 28 of the present exemplary embodiment is made of a resin such as polypropylene (PP), polybutylene terephthalate (PBT), polycarbonate (PC), and Noryl (registered trademark) resin (modified PPE) except for first wall portion 34. First wall portion 34 is made of a metal plate such as iron or aluminum. The pair of second wall portions 36 is integrally formed with base plate 33 by molding. First wall portion 34 is fixed to the pair of second wall portions 36 by fastening members (not illustrated) such as screws.

Bus bar 42 is a substantially strip-shaped member made of metal such as copper or aluminum. One end portion of bus bar 42 is connected to output terminal 22 of one battery 14, and the other end portion of bus bar 42 is connected to output terminal 22 of another battery 14. With respect to bus bars 42, output terminals 22 having the same polarity in a plurality of batteries 14 disposed adjacently to each other may be connected in parallel by bus bars 42 to form a battery block, and these battery blocks may be connected in series by bus bars 42.

Bus bars 42 connected to output terminals 22 of batteries 14 positioned at both ends in stacking direction X each have external connection terminal 44. External connection terminal 44 is connected to an external load (not illustrated). Voltage detection line 46 is placed on duct plate 28. Voltage detection line 46 is electrically connected to the plurality of batteries 14 to detect voltages of respective batteries 14. Voltage detection line 46 includes a plurality of conductive wires (not illustrated). One end of each conductive wire is connected to each bus bar 42, and the other end is connected to connector 48. Connector 48 is connected to an external battery ECU (not illustrated) or the like. Battery ECU controls detection of a voltage or the like of each battery 14, charging and discharging of each battery 14, and the like.

Cooling plate 6 has a flat plate shape extending in stacking direction X and in horizontal direction Y, and is made of a material having high thermal conductivity such as aluminum. Cooling plate 6 is thermally connected to battery stack 2. That is, cooling plate 6 is connected to battery stack 2 in a heat-exchangeable manner, and cools respective batteries 14. In the present exemplary embodiment, battery stack 2 is placed on a main surface of cooling plate 6. Battery stack 2 is placed on cooling plate 6 in a state where a lower surface of battery stack 2 faces cooling plate 6. Accordingly, battery stack 2 and cooling plate 6 are arranged in vertical direction Z. Cooling plate 6 may be connected to an object disposed outside of battery module 1, for example, a vehicle body of a vehicle on which battery module 1 is mounted or the like in a heat-exchangeable manner. A flow path through which a refrigerant such as water or ethylene glycol flows may be disposed in cooling plate 6. With such a configuration, heat exchange efficiency between battery stack 2 and cooling plate 6 can be further enhanced and, eventually, cooling efficiency of batteries 14 can be further enhanced.

Heat conductive layer 8 is a member having an insulating property which is interposed between battery stack 2 and cooling plate 6. That is, cooling plate 6 is thermally connected to battery stack 2 by way of heat conductive layer 8. Heat conductive layer 8 covers the entire bottom surface of battery stack 2. The thermal conductivity of heat conductive layer 8 is higher than the thermal conductivity of air. Heat conductive layer 8 can be formed of, for example, a known resin sheet having good thermal conductivity, such as an acrylic rubber sheet or a silicone rubber sheet. In addition, heat conductive layer 8 may be made of a known adhesive agent, grease, or the like having favorable thermal conductivity and favorable insulating property. When exterior can 18 is sufficiently insulated by insulating film 26 or the like, heat conductive layer 8 may not have insulating property.

By interposing heat conductive layer 8 between battery stack 2 and cooling plate 6, thermal connection between respective batteries 14 and cooling plate 6 can be more reliably obtained. Therefore, the cooling efficiency of respective batteries 14 can be enhanced, and respective batteries 14 can be more uniformly cooled. In a case where heat conductive layer 8 has an insulating property, it is possible to prevent battery stack 2 and cooling plate 6 from being electrically connected to each other with more certainty. Heat conductive layer 8 can suppress displacement between battery stack 2 and cooling plate 6.

Side separators 10 are members that have an insulating property and insulate constraining members 12 and battery stack 2 from each other. In the present exemplary embodiment, the pair of side separators 10 is arranged in horizontal direction Y. Each side separator 10 has an elongated shape elongated in stacking direction X of batteries 14. Battery stack 2, the pair of end plates 4, cooling plate 6, and heat conductive layer 8 are disposed between the pair of side separators 10. Each side separator 10 is made of, for example, a resin having an insulating property. As a resin that is used for forming side separator 10, in the same manner as inter-cell separator 16, thermoplastic resins such as polypropylene (PP), polybutylene terephthalate (PBT), polycarbonate (PC), and Noryl (registered trademark) resin (modified PPE) are named.

Side separator 10 of the present exemplary embodiment has first portion 50, second portion 52, and third portion 53. First portion 50 has a rectangular flat plate shape, and extends in stacking direction X of batteries 14 along a side surface of battery stack 2. Second portion 52 has a strip shape extending in stacking direction X, and protrudes from a lower side of first portion 50 toward a battery stack 2. Third portion 53 has a strip shape extending in stacking direction X, and protrudes from an upper side of first portion 50 toward the battery stack 2. Accordingly, second portion 52 and third portion 53 face each other in the arrangement direction of battery stack 2 and cooling plate 6. Battery stack 2, cooling plate 6, and heat conductive layer 8 are disposed between second portion 52 and third portion 53.

Constraining members 12 are also referred to as bind bars, and are long members that are elongated in stacking direction X of batteries 14. In the present exemplary embodiment, the pair of constraining members 12 is arranged in horizontal direction Y. Each constraining member 12 is made of metal. As examples of metal used for forming constraining member 12, iron, stainless steel, and the like are named. Battery stack 2, the pair of end plates 4, cooling plate 6, heat conductive layer 8, and the pair of side separators 10 are disposed between the pair of constraining members 12.

In the present exemplary embodiment, constraining member 12 includes flat surface portion 54 and a pair of arm portions 56. Flat surface portion 54 has a rectangular shape, and extends in stacking direction X along the side surface of battery stack 2. The pair of arm portions 56 protrude toward battery stack 2 from end portions of flat surface portion 54 on both sides in vertical direction Z. That is, one arm portion 56 protrudes from an upper side of flat surface portion 54 toward the battery stack 2 side, and the other arm portion 56 protrudes from a lower side of flat surface portion 54 toward battery stack 2. Accordingly, the pair of arm portions 56 faces each other in the arrangement direction that battery stack 2 and cooling plate 6 are arranged. Battery stack 2, cooling plate 6, heat conductive layer 8, and side separators 10 are disposed between the pair of arm portions 56.

Contact plate 68 is fixed to regions of flat surface portion 54 that face respective end plates 4 by welding or the like. Contact plates 68 are members that are elongated in vertical direction Z. Through holes 70 are formed in contact plate 68 in a penetrating manner in horizontal direction Y at positions that correspond to fastening holes 4a formed in end plate 4. Through holes 58 are formed in flat surface portion 54 in horizontal direction Y in a penetrating manner at positions that correspond to through holes 70 formed in contact plate 68.

By making the pair of end plates 4 engage with flat surface portions 54 of respective constraining members 12, the plurality of batteries 14 are sandwiched between end plates 4 in stacking direction X. Specifically, battery stack 2 is formed by alternately arranging the plurality of batteries 14 and the plurality of inter-cell separators 16, and such battery stack 2 is sandwiched between the pair of end plates 4 with external end separators 5 sandwiched between battery stack 2 and end plates 4 in stacking direction X. Heat conductive layer 8 is disposed below the lower surface of battery stack 2 and, further, cooling plate 6 is disposed so as to face battery stack 2 with heat conductive layer 8 interposed between cooling plate 6 and battery stack 2. In such a state, battery stack 2, the pair of end plates 4, cooling plate 6, and heat conductive layer 8 are sandwiched between the pair of side separators 10 in horizontal direction Y. Further, the pair of constraining members 12 sandwiches the whole body in horizontal direction Y from the outside of the pair of side separators 10.

The pair of end plates 4 and the pair of constraining members 12 are aligned with each other such that fastening holes 4a, through holes 70, and through holes 58 overlap with each other. Fastening members 59 such as screws are made to pass through through holes 58 and through holes 70 and are made to threadedly engage with fastening holes 4a. With such a configuration, the pair of end plates 4 and the pair of constraining members 12 are fixed to each other. By making the pair of end plates 4 and the pair of constraining members 12 engage with each other, the plurality of batteries 14 are fastened to each other and are constrained in stacking direction X. Accordingly, respective batteries 14 are positioned in stacking direction X.

Constraining members 12 sandwich the plurality of batteries 14 in stacking direction X. Constraining members 12 also sandwich battery stack 2, heat conductive layer 8, and cooling plate 6 in the arrangement direction of battery stack 2, heat conductive layer 8, and cooling plate 6. Specifically, constraining members 12 sandwich the plurality of batteries 14 in stacking direction X in such a manner that both end portions of flat surface portions 54 of constraining members 12 in stacking direction X of batteries 14 engage with the pair of end plates 4. Battery stack 2, heat conductive layer 8, and cooling plate 6 are sandwiched between the pair of arm portions 56 of constraining members 12 in vertical direction Z. That is, constraining members 12 have both a function of fastening the plurality of batteries 14 and a function of fastening battery stack 2 and cooling plate 6. Therefore, unlike the conventional structure, battery stack 2 and cooling plate 6 are not fastened by screws.

In a state where the pair of constraining members 12 is fixed to the pair of end plates 4, first portion 50 of side separator 10 is interposed between the side surface of battery stack 2 and flat surface portion 54 of constraining member 12. With such a configuration, the side surfaces of respective batteries 14 and flat surface portion 54 are electrically insulated from each other. Second portion 52 of side separator 10 is interposed between cooling plate 6 and arm portion 56 on a lower side of constraining member 12. With such a configuration, cooling plate 6 and arm portion 56 of on the lower side are electrically insulated from each other. Third portion 53 of side separator 10 is interposed between the upper surface of battery stack 2 and arm portion 56 on an upper side of constraining member 12. With such a configuration, the upper surfaces of respective batteries 14 and arm portion 56 on the upper side are electrically insulated from each other.

In a state where battery stack 2, heat conductive layer 8, and cooling plate 6 are sandwiched by the pair of arm portions 56 in vertical direction Z, heat conductive layer 8 is elastically deformed or plastically deformed by being pressed by battery stack 2 and cooling plate 6. Consequently, it is possible to obtain thermal connection between battery stack 2 and cooling plate 6 with more certainty. In addition, entire battery stack 2 can be cooled uniformly. Further, deviation between battery stack 2 and cooling plate 6 in the XY plane direction can be further suppressed.

As an example, after assembling of these constituent elements is completed, duct plate 28 is placed on battery stack 2. For example, duct plate 28 is fixed to battery stack 2 by making third portions 53 of the pair of side separators 10 engage with duct plate 28. Then, bus bars 42 are mounted on output terminals 22 of respective batteries 14 so that output terminals 22 of the plurality of batteries 14 are electrically connected to each other. For example, bus bars 42 are fixed to output terminals 22 by welding.

Cover plate 60 is placed on an upper surface of duct plate 28. Cover plate 60 is a plate-shaped member that covers duct plate 28 from above. Cover plate 60 according to the present exemplary embodiment is a so-called top cover that forms a portion of an outer shell of battery module 1, specifically, the upper surface of battery module 1. Cover plate 60 prevents dew condensation water, dust, or the like from being brought into contact with output terminals 22, valve portions 24 of batteries 14, bus bars 42 and the like. Cover plate 60 is made of a resin having an insulating property, for example. Cover plate 60 has insulating cover portions 62 at position overlapping with external connection terminals 44 in vertical direction Z.

Both end portions of cover plate 60 in the first direction (horizontal direction Y in the present exemplary embodiment) are fixed to duct plate 28. Cover plate 60 of the present exemplary embodiment is fixed to duct plate 28 by snap-fitting. Specifically, duct plate 28 has a plurality of engaging claws 72 at both end portions of duct plate 28 in horizontal direction Y in a state where the plurality of engaging claws 72 are disposed at an interval in stacking direction X. Cover plate 60 has engaging holes 74 at positions overlapping with respective engaging claws 72 when viewed in vertical direction Z. Engaging claw 72 and engaging hole 74 form snap-fit portion 71 (see FIGS. 3 and 4). When cover plate 60 is placed on duct plate 28, each engaging claw 72 is inserted into each engaging hole 74. With such insertion of respective engaging claws 72, engaging claws 72 and engaging holes 74 engage with each other so that both end portions of cover plate 60 in horizontal direction Y are fixed to duct plate 28. In a state where cover plate 60 is placed on duct plate 28, external connection terminals 44 are covered by insulating cover portions 62.

Figure 3:
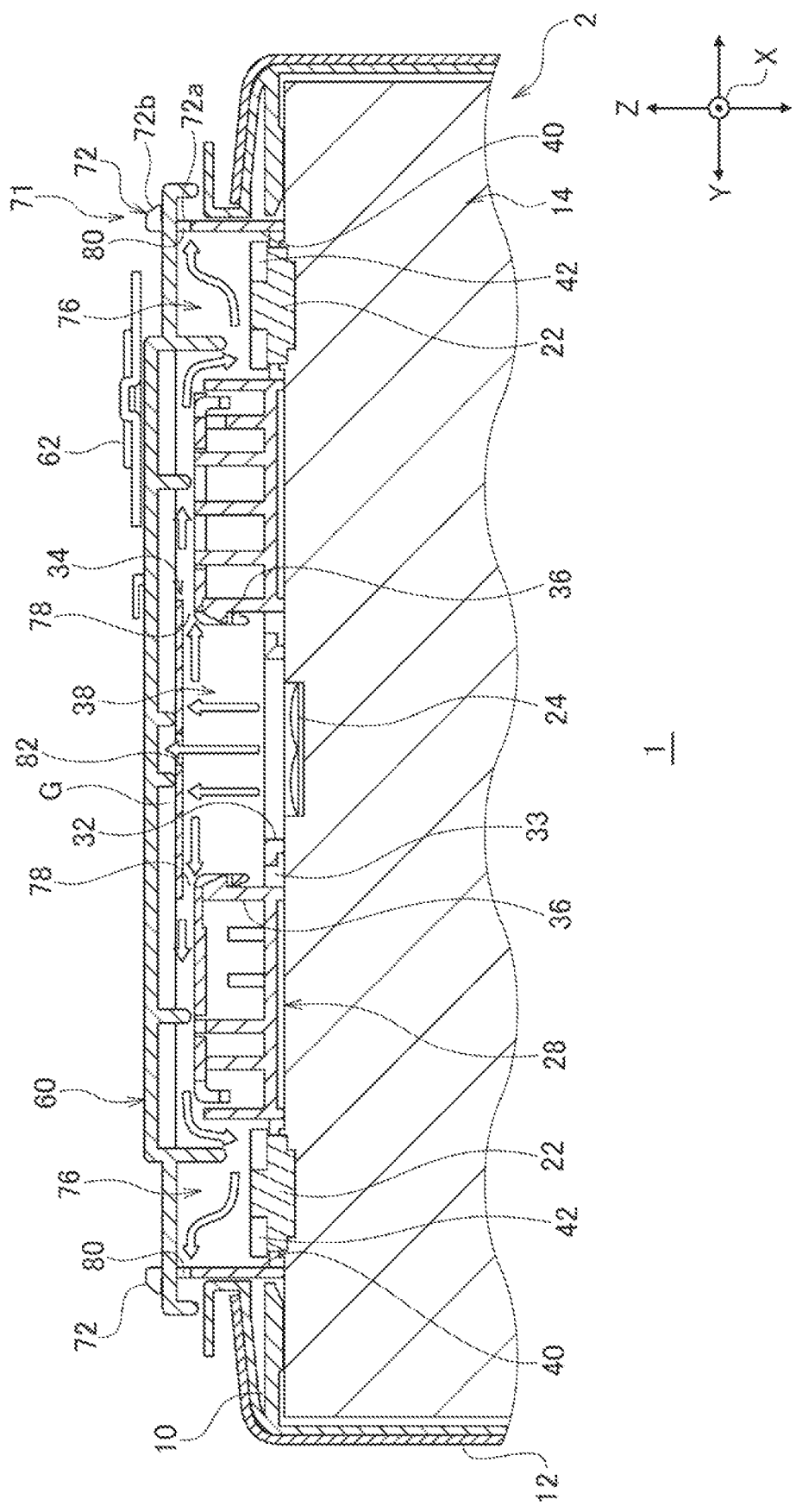
FIG. 3 is a cross-sectional side view of a region in which a duct plate and a cover plate of the battery module are disposed.
Figure 4:
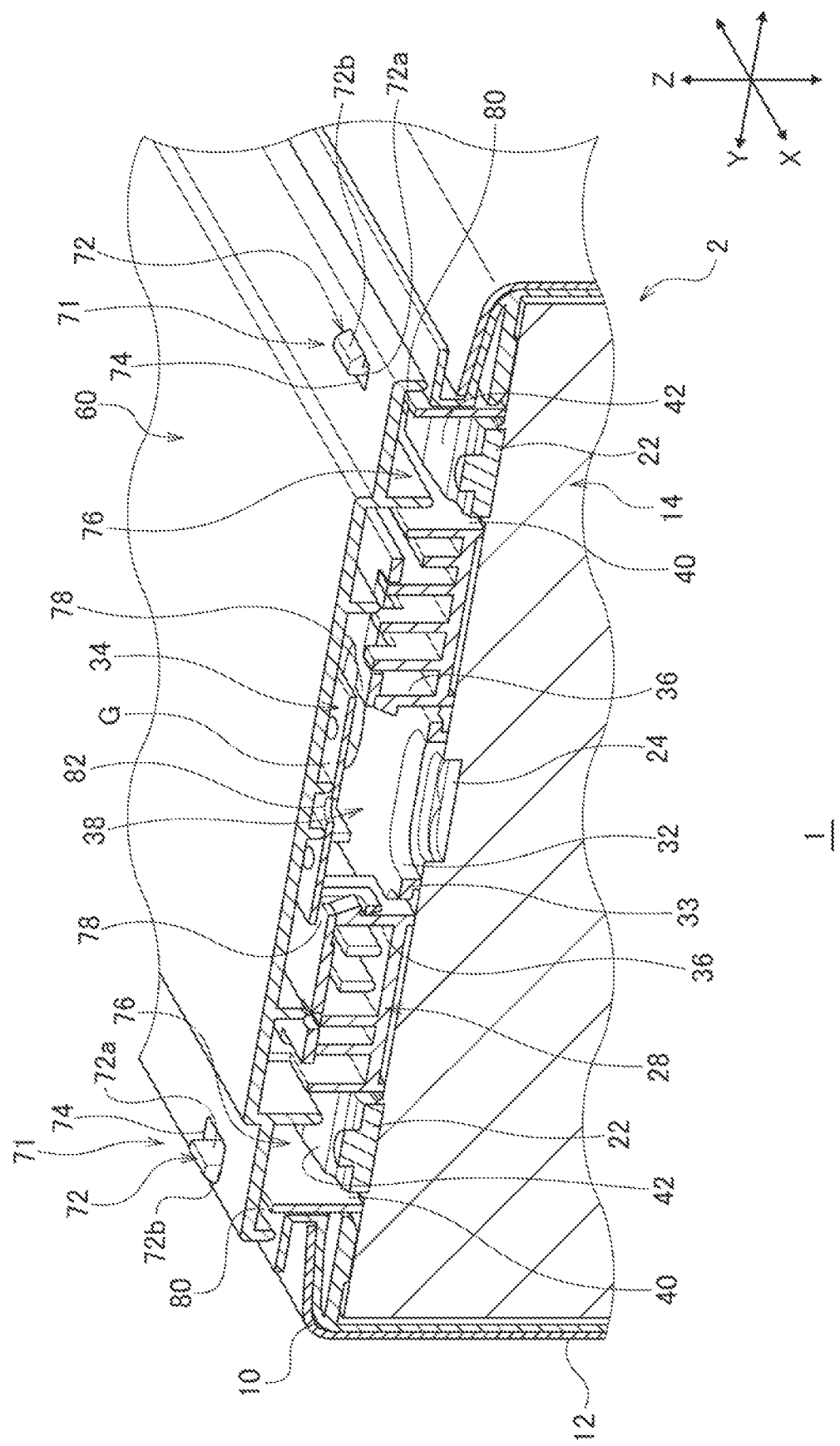
FIG. 4 is a cross-sectional perspective view of a region in which the duct plate and the cover plate of the battery module are disposed.

FIG. 3 is a cross-sectional side view of a region in which duct plate 28 and cover plate 60 of battery module 1 are disposed. FIG. 4 is a cross-sectional perspective view of the region in which duct plate 28 and cover plate 60 of battery module 1 are disposed. In FIG. 3 and FIG. 4, illustration of an internal structure of battery 14 is omitted.

Battery module 1 includes flow path portions 76. Flow path portions 76 are flow paths that allow a gas in gas discharge duct 38 to leak to the outside of battery module 1. Flow path portions 76 are defined by duct plate 28 and cover plate 60, and extend from gas discharge duct 38 in the first direction (horizontal direction Y in the present exemplary embodiment) intersecting with stacking direction X. In the present exemplary embodiment, flow path portions 76 are disposed on both sides in horizontal direction Y with gas discharge duct 38 sandwiched between flow path portions 76. Respective flow path portions 76 are connected to second wall portions 36 directed in horizontal direction Y of gas discharge duct 38. More specifically, opening 78 is formed in each of second wall portions 36, and one end portion of each of flow path portions 76 is connected to opening 78. The other end portions of respective flow path portions 76 are connected to flow path outlets 80 disposed at the end portions of battery module 1 in horizontal direction Y.

The plurality of openings 78 are formed in second wall portion 36 at a predetermined interval in stacking direction X, and one end portion of flow path portion 76 is connected to the plurality of openings 78. Flow path outlet 80 is an opening that is elongated in stacking direction X. Therefore, flow path portion 76 is a planar flow path that expands in stacking direction X and horizontal direction Y.

Cover plate 60 is disposed in a state where predetermined gap G is formed between cover plate 60 and first wall portion 34 that faces valve portion 24 of gas discharge duct 38. That is, first wall portion 34 and cover plate 60 are spaced apart from each other in vertical direction Z by gap G. Openings 82 which allow the inside of gas discharge duct 38 and gap G to communicate with each other are formed in first wall portion 34 of gas discharge duct 38. In the present exemplary embodiment, the plurality of openings 82 are uniformly arranged over entire first wall portion 34 (see FIG. 2). Further, both end portions of gap G in horizontal direction Y are connected to flow path portions 76. Therefore, gas discharge duct 38 and flow path portions 76 communicate with each other not only through openings 78 formed in second wall portions 36 but also through openings 82 formed in first wall portion 34 and gap G. Opening 82 can be formed by, for example, punching a metal plate constituting first wall portion 34.

Opening 78 illustrated in FIGS. 3 and 4 is formed by a gap formed between an upper end of second wall portion 36 (also referred to as a portion of the upper end of second wall portion 36 formed by cutting out a part of the upper end) in a region lower than other regions and first wall portion 34. However, the present invention is not particularly limited to such a structure. For example, opening 78 may be formed of a through hole which penetrates second wall portion 36 in horizontal direction Y. Opening 78 may have a size which allows opening 78 to extend from the upper end to the lower end of second wall portion 36. That is, the second wall portion 36 may be divided into a plurality of portions by opening 78.

When a gas in battery 14 is blown off from valve portion 24, the gas impinges on first wall portion 34 which face valve portion 24. The large part of a gas that has impinged on first wall portion 34 flows along first wall portion 34 and flows into flow path portions 76 from openings 78. The gas flowing into flow path portions 76 flows through flow path portions 76 in horizontal direction Y and in stacking direction X, and leaks from flow path outlets 80 to the outside of battery module 1. A part of the gas that has impinged on first wall portion 34 flows into gap G through openings 82 formed in first wall portion 34. The gas which has flown into gap G flows into flow path portions 76 from gap G and leaks out of battery module 1 from flow path outlets 80.

At least a portion of the gas blown off from battery 14 is a combustible gas. The gas blown off from battery 14 also contains fine particles such as broken pieces of a battery structure. When a combustible gas having a high temperature and fine particles having a high temperature are discharged to the outside of battery module 1, there is a possibility that a magnitude of a fire outside battery module 1 is increased. On the other hand, in the present exemplary embodiment, a gas blown off from valve portion 24 is once received by gas discharge duct 38, and then is discharged to the outside of battery module 1 through flow path portion 76. As a result, the temperature of the gas and the temperature of the fine particles can be lowered until the gas or the fine particles are released to the outside of battery module 1.

In addition, by allowing a part of the gas blown off to gas discharge duct 38 to flow out from openings 82 to gap G, it is possible to suppress an excessive increase in an inner pressure in gas discharge duct 38. In addition, fine particles each having a size larger than a size of each openings 82 are caught by openings 82. As a result, some of fine particles and the gas can be separated from each other.

As viewed in vertical direction Z, gas discharge duct 38 is disposed at a position that overlaps with a center portion of cover plate 60 in the first direction (horizontal direction Y in the present exemplary embodiment). As described above, both end portions of cover plate 60 in the first direction are fixed to duct plate 28. With such a configuration, when an amount of gas blown off from battery 14 increases, cover plate 60 is deformed in a state where the center portion of cover plate 60 bulges. The "center portion" is, for example, a region that includes an intermediate point at an equal distance in the first direction with respect to respective engaging holes 74 positioned on the outermost side on one end of cover plate 60 and respective engaging holes 74 positioned on the outermost side on the other end in the first direction.

Engaging claw 72 of snap-fit portion 71 has support strut portion 72a and protruding portion 72b. Support strut portion 72a extends in vertical direction Z along which duct plate 28 and cover plate 60 are arranged. Protruding portion 72b protrudes from support strut portion 72a toward the opposite of gas discharge duct 38 at a distal end of support strut portion 72a. That is, in horizontal direction Y, gas discharge duct 38 is disposed at a center portion of battery module 1, and protruding portions 72b protrude toward the outside of battery module 1. Duct plate 28 and cover plate 60 are fixed to each other in such a manner that engaging claws 72 are inserted into engaging holes 74 and protruding portions 72b are caught by peripheral edge portions of engaging holes 74.

When cover plate 60 is deformed in a state where the center portion of cover plate 60 bulges, engaging holes 74 are displaced so as to approach the center portion of battery module 1. With this displacement of engaging holes 74, support strut portion 72a of engaging claw 72 is elastically deformed in a state where the distal end of support strut portion 72a approaches the center portion of battery module 1. On the other hand, protruding portion 72b protrudes toward the outside of battery module 1. Accordingly, even when support strut portion 72a is deformed so as to approach the center portion of battery module 1, a state in which protruding portion 72b is caught by the peripheral edge portion of engaging hole 74 can be easily maintained.

As has been described above, battery module 1 according to the present exemplary embodiment includes: battery stack 2 having the plurality of batteries 14 that are stacked, duct plate 28 placed on battery stack 2; cover plate 60 placed on duct plate 28, and flow path portions 76 defined by duct plate 28 and cover plate 60. Each of the plurality of batteries 14 of battery stack 2 has valve portion 24 through which a gas is blown off. Duct plate 28 includes gas discharge duct 38, and duct plate 28 covers the surface of battery stack 2 on which the plurality of valve portions 24 are disposed. Gas discharge duct 38 extends in stacking direction X of batteries 14, is connected to valve portions 24 of respective batteries 14, and temporarily stores a blown-off gas. Flow path portions 76 extend from gas discharge duct 38 in the first direction that intersects with stacking direction X of batteries 14, and makes a gas in gas discharge duct 38 leak to the outside of battery module 1. Cover plate 60 is disposed in a state where predetermined gap G is formed between cover plate 60 and first wall portion 34 that faces valve portion 24 of gas discharge duct 38. Openings 82 that allow the inside of gas discharge duct 38 and gap G to communicate with each other are formed in first wall portion 34 of gas discharge duct 38.

By connecting respective valve portions 24 to gas discharge duct 38, gas discharge duct 38 can receive an impact and a pressure of a blown-off gas. In particular, gas discharge duct 38 can receive a large impact or a rapidly rising pressure generated at an initial stage of blowing off of a gas. A gas blown off to gas discharge duct 38 gradually leaks to the outside of battery module 1 through flow path portions 76. Accordingly, it is possible to prevent a gas from being vigorously blown off to the outside of battery module 1. In addition, by allowing a gas gradually leak through flow path portions 76, a temperature of the gas or fine particles can be lowered until the gas or the fine particles reach flow path outlets 80. With such a configuration, it is possible to suppress the occurrence of fire outside battery module 1.

By forming openings 82 in first wall portion 34 of gas discharge duct 38, it is possible to suppress an excessive increase in an inner pressure of gas discharge duct 38. As a result, it is possible to suppress breakage of gas discharge duct 38 caused by blowing off of a gas from battery 14. Therefore, according to the present exemplary embodiment, safety of battery module 1 can be enhanced. In addition, it is possible to increase the capacity of battery module 1 while maintaining the safety of battery module 1.

In addition, fine particles each having a size larger than a size of each openings 82 are caught by openings 82. Therefore, it is possible to prevent the fine particles from being released to the outside of battery module 1, and it is also possible to prevent the occurrence of fire outside the module. In addition, by catching fine particles by openings 82, the fine particles and a gas can be separated from each other. As a result, a temperature of a gas can be lowered more quickly and hence, the occurrence of fire outside the module can be suppressed.

In the present exemplary embodiment, first wall portion 34 is formed of a metal plate. That is, first wall portion 34 has high thermal conductivity. With such a configuration, it is possible to more quickly diffuse heat of a gas blown off from battery 14. As a result, a temperature of a gas leaking from battery module 1 can be lowered, and the occurrence of fire outside the module can be more effectively suppressed.

In addition, in the present exemplary embodiment, duct plate 28 includes the pair of second wall portions 36 that is arranged side by side with valve portions 24 sandwiched between the pair of second wall portions 36, and defines gas discharge duct 38 together with first wall portion 34. The pair of second wall portions 36 has openings 78 that allow gas discharge duct 38 and flow path portions 76 to communicate with each other. Accordingly, battery module 1 has a gas flow path that extends from gas discharge duct 38 to flow path portions 76 through openings 78 formed in second wall portions 36, and a gas flow path that extends from gas discharge duct 38 to flow path portions 76 through openings 82 formed in first wall portion 34. By dividing a flow path of a gas into a plurality of flow path portions in this manner, a temperature of the gas can be lowered more quickly. In addition, by allowing a gas to flow out from openings 78 formed in second wall portions 36, the time for retaining the gas in gas discharge duct 38 can be prolonged compared with a case where the gas is allowed to flow out from openings 82 formed in first wall portion 34. Therefore, the occurrence of fire outside the module can be more effectively suppressed.

In the present exemplary embodiment, both end portions of cover plate 60 in the first direction are fixed to duct plate 28. Gas discharge duct 38 is disposed at a position that overlaps with the center portion of cover plate 60 in the first direction. With such a configuration, when an amount of gas blown off from battery 14 increases, cover plate 60 can be deformed in a state where the center portion of cover plate 60 bulges. Therefore, it is possible to increase a volume of a space in which gas stays in battery module 1 while avoiding removal of cover plate 60 from battery module 1. Therefore, an amount of gas that can be temporarily retained in battery module 1 can be increased, and the retention time can be also prolonged. As a result, the occurrence of fire outside the module can be more effectively suppressed.

Battery module 1 according to the present exemplary embodiment includes snap-fit portions 71. Each snap-fit portion 71 is formed of engaging claw 72 and engaging hole 74 that engage with each other to fix duct plate 28 and cover plate 60 to each other. Engaging claw 72 includes: support strut portion 72a extending in the direction along which duct plate 28 and cover plate 60 are arranged; and protruding portion 72b protruding from support strut portion 72a toward the opposite of gas discharge duct 38. Duct plate 28 and cover plate 60 are fixed to each other in such a manner that engaging claws 72 are inserted into engaging holes 74 and protruding portions 72b are caught by peripheral edge portions of engaging holes 74. By allowing protruding portion 72b to protrude to the opposite of gas discharge duct 38, it is possible to prevent the engagement between engaging claw 72 and engaging hole 74 from being released when cover plate 60 is deformed. Therefore, cover plate 60 can be more stably fixed to duct plate 28.

The exemplary embodiment of the present invention has been described in detail heretofore. The above-described exemplary embodiment is merely a specific example for carrying out the present invention. The contents of the exemplary embodiment do not limit the technical scope of the present invention, and many design changes such as changes, additions, and deletions of constituent elements can be made without departing from the spirit of the invention defined in claims. Novel exemplary embodiments with a design change acquire both advantageous effects of the exemplary embodiment and the modification that are combined with each other. In the above-described exemplary embodiment, with respect to the contents where such design changes are allowable, the contents are emphasized with expressions such as "of the present exemplary embodiment" and "in the present exemplary embodiment". However, the design changes are allowable even with respect to the contents which are not emphasized with such expressions. Any arbitrary combination of constituent elements included in the exemplary embodiment is also effective as the configuration of the present invention. Hatching applied to the cross sections in the drawings does not limit materials of objects to which hatching is applied.

(First Modification)

FIG. 5 is a cross-sectional side view of a region including duct plate 28 and cover plate 60 of battery module 1 according to a first modification. In FIG. 5, the illustration of an internal structure of battery 14 is omitted. In battery module 1 of the first modification, heat transfer suppression layer 84 is disposed in a region where cover plate 60 overlaps with openings 82 formed in first wall portion 34 as viewed from a direction along which the duct plate and the cover plate are arranged (vertical direction Z in the present exemplary embodiment). Heat transfer suppression layer 84 suppresses the heat transfer from a gas blown off from battery 14 to cover plate 60.

Heat transfer suppression layer 84 is, for example, a sheet having a heat insulating property, and is disposed on a surface of cover plate 60 that faces opening 82. For example, heat transfer suppression layer 84 is laminated to the surface of cover plate 60 by an adhesive agent or the like. In the present exemplary embodiment, a recessed portion is formed on the surface of cover plate 60 that faces opening 82, and heat transfer suppression layer 84 is fitted into the recessed portion. With such a configuration, heat transfer suppression layer 84 can easily be positioned.

A gas having a high temperature blown off from battery 14 and passing through openings 82 impinges on heat transfer suppression layer 84. Therefore, heat of the blown-off gas can be received by heat transfer suppression layer 84. Accordingly, heat transfer suppression layer 84 can suppress the transfer of heat of the gas to cover plate 60. As a result, the heat resistance of cover plate 60 can be enhanced and hence, it is possible to reduce a concern that cover plate 60 is deformed or damaged by the heat of the gas. For example, heat transfer suppression layer 84 is made of a material having lower thermal conductivity than a material used for forming cover plate 60. Heat transfer suppression layer 84 has lower thermal conductivity than air. As the material used for forming heat transfer suppression layer 84, a fiber integrated body in which organic fibers, inorganic fibers and the like are integrated, a heat transfer suppression sheet formed of a heat insulating material and a laminate film can be named as examples.

Heat transfer suppression layer 84 may be a member having high thermal conductivity such as an aluminum tape or an iron sheet. In this case, heat of a gas can be quickly dispersed by heat transfer suppression layer 84 and hence, the transfer of heat to cover plate 60 can be suppressed.

(Others)

The number of batteries 14 that battery module 1 includes is not particularly limited. The structures of respective parts of battery module 1 including the shape of side separator 10 and the fastening structure between end plates 4 and constraining members 12 are not particularly limited. Battery 14 may have a cylindrical shape or the like. In a case where both heat conduction and a frictional force can be sufficiently ensured between battery stack 2 and cooling plate 6, heat conductive layer 8 may be omitted, and an insulating sheet made of PET or PC may be interposed between battery stack 2 and cooling plate 6. Opening 78 may not be formed in second wall portions 36 of gas discharge duct 38. In this case, all gas in gas discharge duct 38 flows into flow path portions 76 through openings 82 and gap G.

In the exemplary embodiment and the modification, duct plate 28 has engaging claws 72, and cover plate 60 has engaging holes 74. However, the present invention is not particularly limited to this configuration. Duct plate 28 may have engaging holes 74, and cover plate 60 may have engaging claws 72. That is, engaging claws 72 are formed on either one of duct plate 28 or cover plate 60, and engaging holes 74 are formed on the other of duct plate 28 or cover plate 60.

REFERENCE MARKS IN THE DRAWINGS

1: battery module
2: battery stack
14: battery
24: valve portion
28: duct plate
34: first wall portion
36: second wall portion
38: gas discharge duct
60: cover plate
76: flow path portion
82: opening
84: heat transfer suppression layer
G: gap

The invention claimed is:

1. A battery module comprising:
a battery stack including a plurality of batteries that are stacked, the plurality of batteries including a plurality of valves through which a gas is blown off, the plurality of the valves being disposed on a surface of the battery stack;
a duct plate configured to cover the surface of the battery stack, the duct plate including a gas discharge duct that is elongated and extends in a stacking direction of the batteries, is connected to the valves of the batteries, and temporarily stores the gas blown off through the valves;
a cover plate placed on the duct plate; and
a flow path portion defined by the duct plate and the cover plate, the flow path portion extending from the gas discharge duct in a first direction that intersects with the stacking direction of the batteries and allowing leaking of the gas in the gas discharge duct to an outside of the battery module,
wherein the cover plate is disposed in a state where a predetermined gap is configured between the cover plate and a first wall of the gas discharge duct that faces the valves,
a first opening that allows an inside of the gas discharge duct and the predetermined gap to communicate with each other is configured in the first wall of the gas discharge duct,
the duct plate includes a pair of second walls that is arranged side by side with each of the plurality of valves sandwiched between the pair of second walls in a direction perpendicular to the stacking direction of the batteries and defines the gas discharge duct together with the first wall,
the first wall and the pair of second walls are elongated and extend parallel to one another in the stacking direction of the batteries, and
a second opening that allows the gas discharge duct and the flow path to communicate with each other is configured in the pair of second walls respectively.

2. The battery module according to claim 1, wherein the first wall is formed of a metal plate.

3. The battery module according to claim 1, wherein the cover plate includes a heat transfer suppression layer that suppresses heat transfer from the gas to the cover plate in a region that overlaps with the first opening as viewed in a direction along which the duct plate and the cover plate are arranged.

4. The battery module according to claim 1, wherein both ends of the cover plate in the first direction are fixed to the duct plate, and the gas discharge duct is disposed at a position that overlaps with a center part of the cover plate in the first direction.

5. The battery module according to claim 1, further comprising
a snap-fit part configured of an engaging claw and an engaging hole that engage with each other, the snap-fit part configured to fix the duct plate and the cover plate to each other,
wherein the engaging claw includes: a support strut part extending in a direction along which the duct plate and the cover plate are arranged; and a protruding part protruding from the support strut part toward the opposite of the gas discharge duct, and
the duct plate and the cover plate are configured to be fixed to each other in such a manner that the engaging claw is inserted into the engaging hole, and the protruding part is caught by a peripheral edge of the engaging hole.

* * * * *